(12) United States Patent
Snook

(10) Patent No.: US 12,309,894 B2
(45) Date of Patent: May 20, 2025

(54) DEVELOPING BIOLOGICAL ILLUMINATION SYSTEMS

(71) Applicant: Circadian Tunable Lighting, LLC, Mamorneck, NY (US)

(72) Inventor: Joel Snook, Grass Valley, CA (US)

(73) Assignee: Circadian Tunable Lighting, LLC, Mamaroneck, NY (US)

( * ) Notice: Subject to any disclaimer, the term of this patent is extended or adjusted under 35 U.S.C. 154(b) by 0 days.

(21) Appl. No.: 18/530,677

(22) Filed: Dec. 6, 2023

(65) Prior Publication Data

US 2024/0224400 A1    Jul. 4, 2024

Related U.S. Application Data

(63) Continuation of application No. 17/960,617, filed on Oct. 5, 2022.

(60) Provisional application No. 63/252,475, filed on Oct. 5, 2021.

(51) Int. Cl.
*H05B 47/11*    (2020.01)
*H05B 47/115*    (2020.01)

(52) U.S. Cl.
CPC ........... *H05B 47/11* (2020.01); *H05B 47/115* (2020.01)

(58) Field of Classification Search
CPC .... H05B 47/11; H05B 47/115; H05B 47/105; H05B 45/20; H05B 47/10; H05B 47/00; Y02B 20/40; F21V 23/00; F21V 99/00
See application file for complete search history.

(56) References Cited

U.S. PATENT DOCUMENTS

| | | | | |
|---|---|---|---|---|
| 10,471,231 | B2 * | 11/2019 | Moore-Ede | H05B 47/16 |
| 2018/0043130 | A1 * | 2/2018 | Moore-Ede | H05B 47/16 |
| 2018/0352630 | A1 * | 12/2018 | Ueno | H05B 47/105 |
| 2019/0335565 | A1 * | 10/2019 | Lai | H05B 47/11 |
| 2021/0003452 | A1 * | 1/2021 | Ashdown | H05B 47/175 |

* cited by examiner

*Primary Examiner* — Bao Q Truong
(74) *Attorney, Agent, or Firm* — Kristofer E. Elbing

(57) ABSTRACT

Disclosed, in one general aspect, is a method of designing an illumination system for illuminating an occupied space to be occupied by one or more occupants that includes selecting illumination parameters for a first area illumination element, selecting illumination parameters for a second area illumination element, and deriving control parameters to derive, from selected levels of a first multi-level illumination control and selected levels of a second multi-level illumination control, a first control signal to drive the first area illumination element and a second control signal operative to drive the second area illumination element for each combination of levels from the first and second controls to independently vary an illumination level and a biological attribute of the illumination of the occupied space in response to independent actuation of the first and second multi-level illumination controls.

17 Claims, 7 Drawing Sheets

DEVELOPING BIOLOGICAL ILLUMINATION SYSTEMS

CROSS-REFERENCE TO RELATED APPLICATION

This application is a continuation of U.S. application Ser. No. 17/960,617, filed Oct. 5, 2022, which claims the benefit of U.S. Provisional Application No. 63/252,475, filed Oct. 5, 2021, which are both herein incorporated by reference.

FIELD OF THE INVENTION

This invention relates to designing lighting systems with enhanced biological and visual attributes.

BACKGROUND OF THE INVENTION

Humans and many animals and plants are adapted to a 24-hour schedule of sunlight and darkness that can vary by the time of the year. When they are moved indoors, daylight and its influence on scheduling biological processes is eliminated or attenuated while the artificial light that replaces sunlight can interact with the scheduling biological processes whether intentionally or not. There are theories that claim this lack of sunlight driven scheduling causes a variety of biological deficits or that appropriate light cues can improve biological processes over weather and seasonal variable sunlight exposure.

In the past, sunlight has been replaced with artificial lights solely intended to enable human vision. There has been extensive research and experience to guide the amount of light required for common tasks. The development of dimmable lighting has also been an improvement over non-dimmable lighting. And color temperature and illumination color can also be adjusted. But these selections by themselves appear to have a limited impact on biological processes.

SUMMARY OF THE INVENTION

In one general aspect, the invention features a method of designing an illumination system for illuminating an occupied space to be occupied by one or more occupants that includes selecting illumination parameters for a first area illumination element, selecting illumination parameters for a second area illumination element, and deriving control parameters to derive, from selected levels of a first multi-level illumination control and selected levels of a second multi-level illumination control, a first control signal to drive the first area illumination element and a second control signal operative to drive the second area illumination element for each combination of levels from the first and second controls to independently vary an illumination level and a biological attribute of the illumination of the occupied space in response to independent actuation of the first and second multi-level illumination controls.

In another general aspect, the invention features an illumination system for illuminating an area of an occupied space to be occupied by one or more occupants that includes a control module with a first input responsive to a first multi-level illumination command designated as an illumination level command and a second input responsive to a second multi-level illumination command designated as a biological illumination command. A first driving output in the control module is operative to drive a first area illumination element having a first selected illumination profile and a second driving output operative to drive a second area illumination element having a second selected illumination profile. The control module also includes a controller that is responsive to different levels of a first multi-level illumination command designated as an illumination level command, responsive to different levels of a second multi-level illumination command designated as a biological illumination command, and operative to derive from the levels of the first multi-level illumination command and from the levels of the second multi-level illumination command a first control signal to drive the first output for the first area illumination element and a second control signal operative to drive the second output for the second area illumination element for each combination of levels from the first and second commands to independently vary an illumination level and a biological attribute of the illumination of the occupied space in response to independent commands from the first and second multi-level illumination commands.

In preferred embodiments, the first multi-level illumination command can be from a first illumination control, a level selection made before installation of the system, a scheduler, or a control system. Similarly, the second multi-level illumination command is from a first illumination control, a level selection made before installation of the system, a scheduler, or a control system. The control module can include software stored in a memory element and operative to run on a processor. The control module can include a processor, software stored in a memory element and operative to run on the processor, power output circuitry responsive to the controller and operative to provide a drive signal on the first and second outputs to directly drive illumination elements on the first and second outputs. The occupied space can be an interior space with walls to reflect the illumination form the first and second illumination elements and thereby provide indirect light to the occupants. The controller can be specifically programmed based on characteristics of the occupied space. The controller can be programmed based on input from a calibration sensor deployed in the occupied space. The controller can be programmed based on input from a calibration sensor deployed in the occupied space in successive steps for successive area illumination elements. The controller can be programmed based on input from a multispectral calibration sensor deployed in the occupied space. The controller can receive a feedback signal from a sensor deployed in the occupied space. The system can further include a timer that is operative to adjust the biological and/or illumination levels over time. The first and second area illumination elements can be selected based on characteristics of the occupied space. The controller can include a control law that also implements an energy delivery and/or energy efficiency function. The controller can include a control law that is based on selected occupant photoreceptors. The controller can include a control law that is designed to influence an occupant circadian rhythm. The controller can include a control law that preferably adjusts light in wavelengths that contribute differently to biological illumination parameters and perceived visual brightness. The first area illumination element and the second area illumination element can have different bandwidth characteristics and/or spectral characteristics. The controller can be designed based on a computer-optimized illumination solution for the occupied space. The controller can be field-updatable. The controller can be further responsive to an occupancy sensor. The controller can be further responsive to an occupancy indication that reports the presence of a particular individual and adjusts illumination parameters based on his or her presence.

The system can further include a first area illumination element having a first illumination profile operatively connected to the first driving output of the control module, and a second area illumination element having a second illumination profile operatively connected to the second driving output of the control module. The system can further include further area illumination elements that are controlled together with the first and second area illumination elements. The system can control a plurality of area illumination elements together in a single fixture. The system can control a plurality of area illumination elements together in a plurality of fixtures.

In a further general aspect, the invention features an illumination method for illuminating an occupied space to be occupied by one or more occupants that includes receiving illumination level control signals from a first multi-level illumination control designated as an illumination level control, receiving illumination level control signals from a second multi-level illumination control designated as a biological illumination control, and deriving from the selected levels of the first multi-level illumination control and from the selected levels of the second multi-level illumination control a first control signal to drive a first output for a first area illumination element and a second control signal operative to drive a second output for a second area illumination element for each combination of levels from the first and second controls to independently vary an illumination level and a biological attribute of the illumination of the occupied space in response to independent actuation of the first and second multi-level illumination controls.

In another general aspect, the invention features an illumination method for illuminating an occupied space to be occupied by one or more occupants that includes driving a first illumination element designated as an illumination level element, driving a second illumination element designated as a biological element, and continuously adjusting the steps of driving the first illumination element and driving the second illumination element to continuously adjust illumination levels and biological effects over time. The step of continuously adjusting can adjust biological effects without significantly changing perceived illumination quality.

Systems according to the invention can provide a variety of optimizations to lighting systems by taking into account factors including user input, desired subjective light quality, time of day and relationship to exterior light, and/or the space in which the lighting systems are deployed. By taking these factors into account, a system can be designed to provide an optimum illumination for a variety of conditions.

DETAILED DESCRIPTION OF AN ILLUSTRATIVE EMBODIMENT

Figure 1:
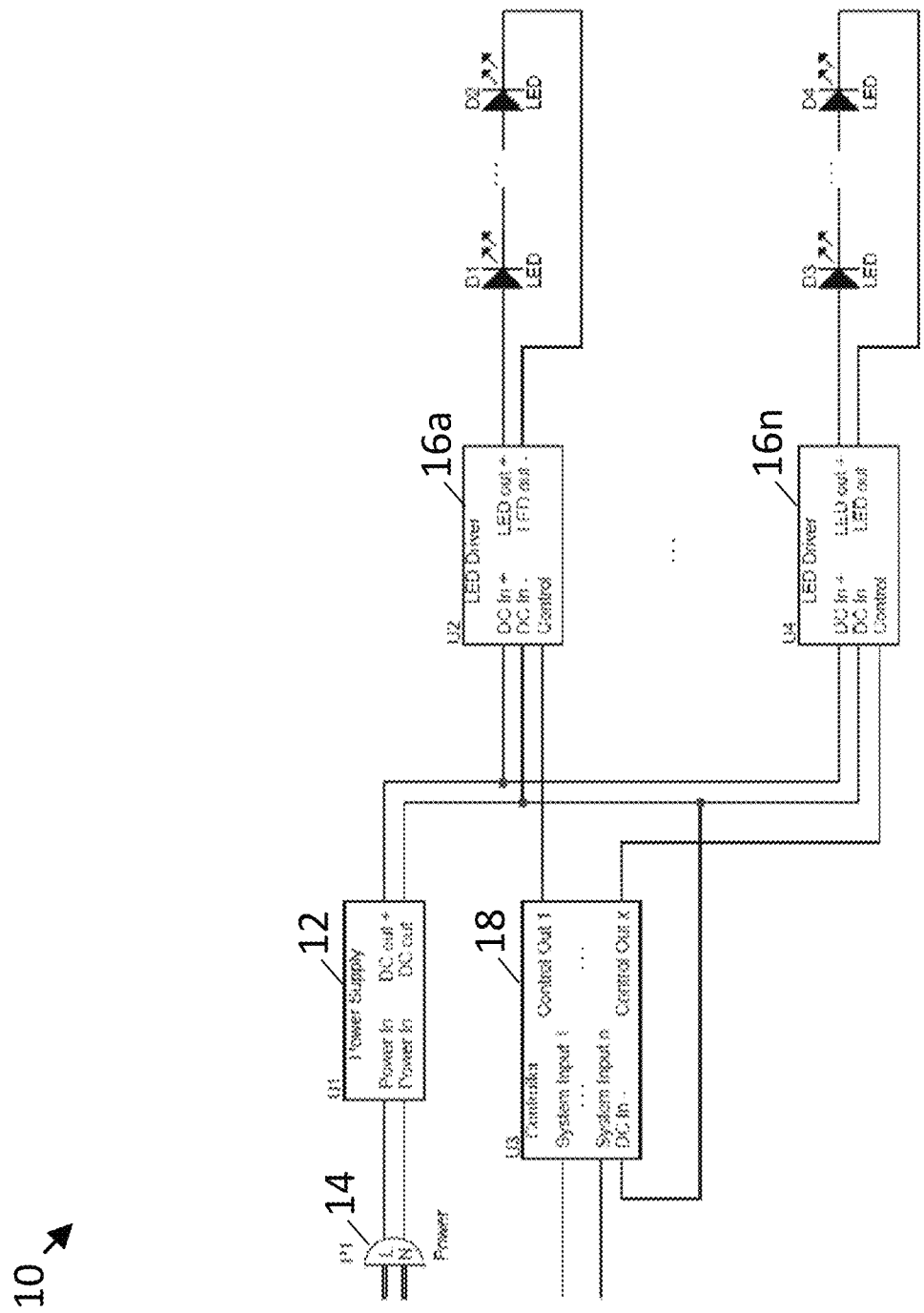
FIG. 1 is a block diagram of an illustrative light engine according to the invention.

Referring to FIG. 1, a light engine 10 is a basic illumination system that includes a power supply 12 that receives power from a plug or other typically alternating current mains connection 14 (e.g., 110 or 220 V AC). The power supply provides typically direct current to two or more illumination element drivers, such as LED drivers 16a, . . . 16n. It also powers a controller 18 that can include one or more system inputs, such as user control, sensor, and timer inputs, and provides control outputs to the drivers. The controller implements a control function that optimizes light attributes, as discussed in more detail below.

Figure 2:
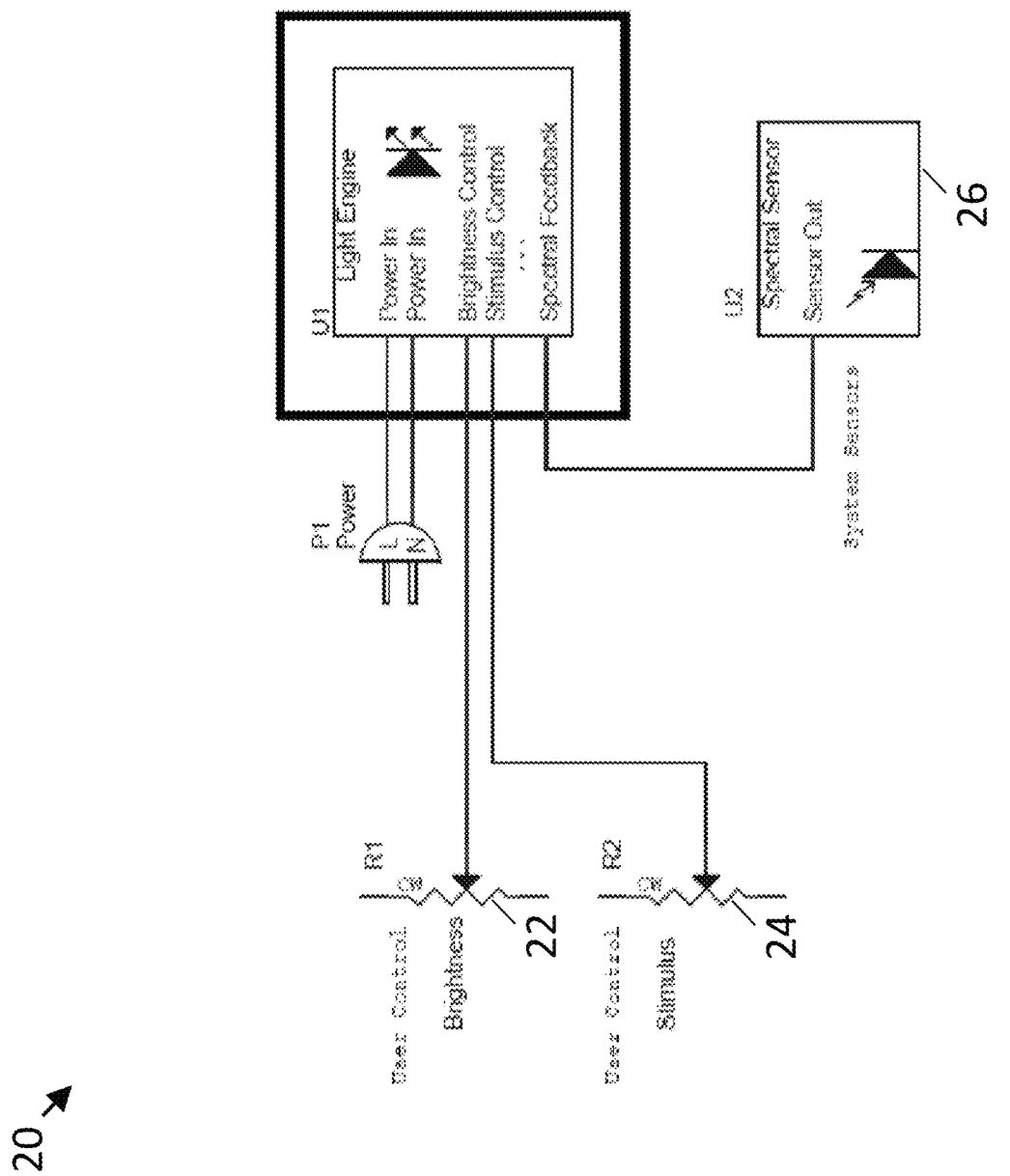
FIG. 2 is a block diagram of a larger illustrative lighting system that employs a light engine such as the one shown in FIG. 1.

Referring to FIG. 2, a light engine, such as the one shown in FIG. 1, can be used in a larger illumination system 20 in which controller inputs receive an illumination signal, such as a brightness signal from a user brightness control 22, and a biological signal, such as a stimulus signal from a user stimulus control 24. In this system, the controller also includes one or more inputs for sensor signals from one or more system sensors, such as a feedback sensor 26 or a calibration sensor.

Figure 3:
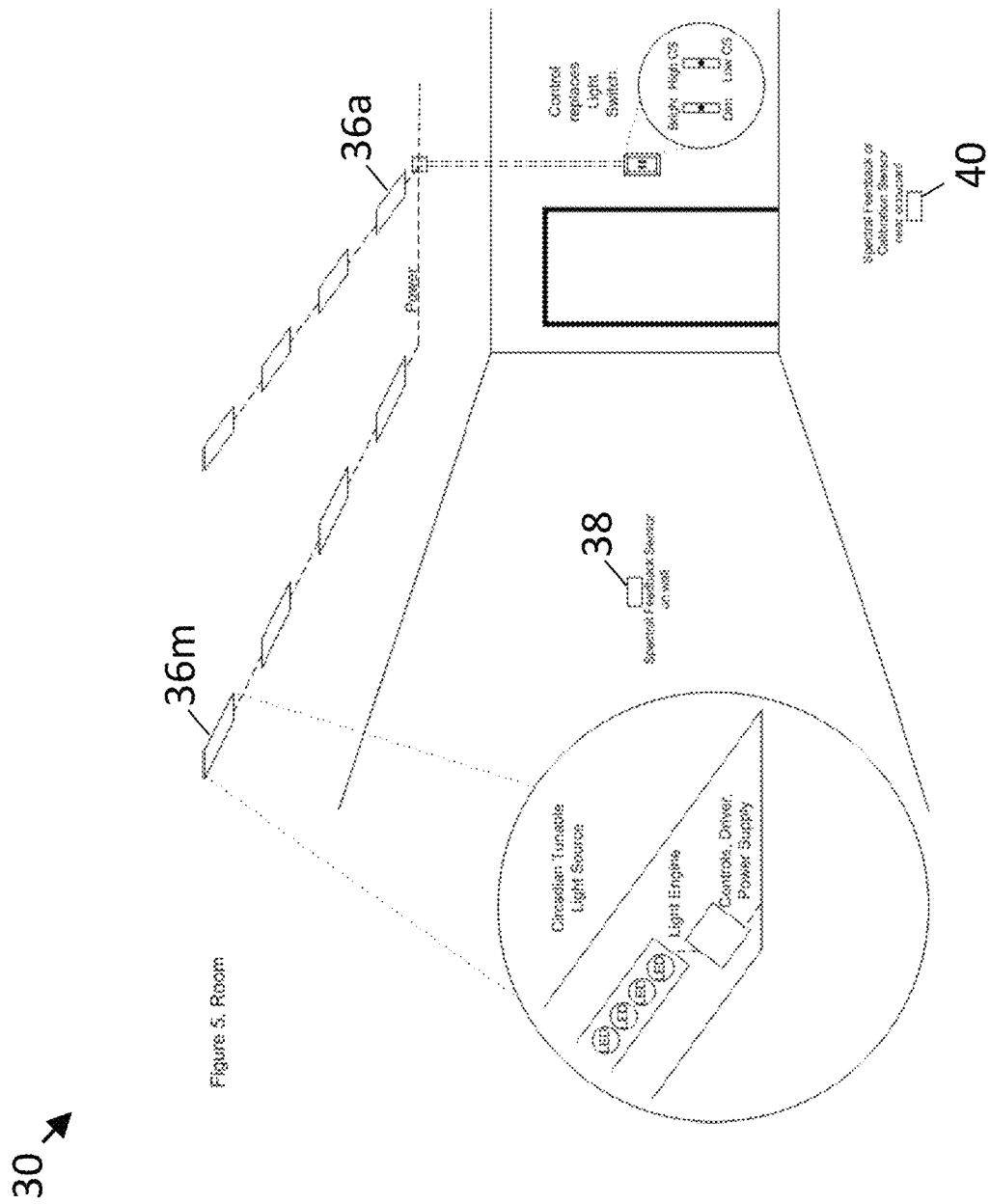
FIG. 3 is a perspective diagram of an illustrative architectural space in which a system that employs a light engine such as the one shown in FIG. 1 is deployed.

Referring to FIG. 3, a light engine such as the one shown in FIG. 1, can be deployed as part of a larger illumination system in an architectural space 30, such as a room in a dwelling, or an office, conference room, retail showroom, or other workspace. It includes a wall-mounted user brightness control 32 and a wall-mounted user circadian stimulus control 34, which each have outputs that are provided to light engines that are mounted in a plurality of light fixtures 36a . . . 36m. A spectral feedback sensor 38 can be mounted on the wall of the space, and a feedback or calibration sensor 40 can be located in an area where an occupant of the space typically spends time. The implementation of FIG. 3 is shown using fixtures that include integrated light engines, but the light engines could also be provided in separate modules that install in standard, off-the-shelf light fixtures.

In this system, the controller derives control signals for the light fixtures from user-selected levels of the illumination control and from user-selected levels of the circadian stimulus control to at least partially independently vary an illumination level and a biological attribute of the illumination of the occupied space in response to independent actuation of the first and second multi-level user illumination controls. The calibration sensor 40 can provide a sensor input that acts as a basis for the controller to adjust the control signals based on the actual light detected in the room during the calibration operation. The feedback sensor 38 can provide sensor input that acts as a basis for the controller to adjust the illumination control signals based on the actual light detected in the room during ongoing operation of the lighting system.

Figure 4:
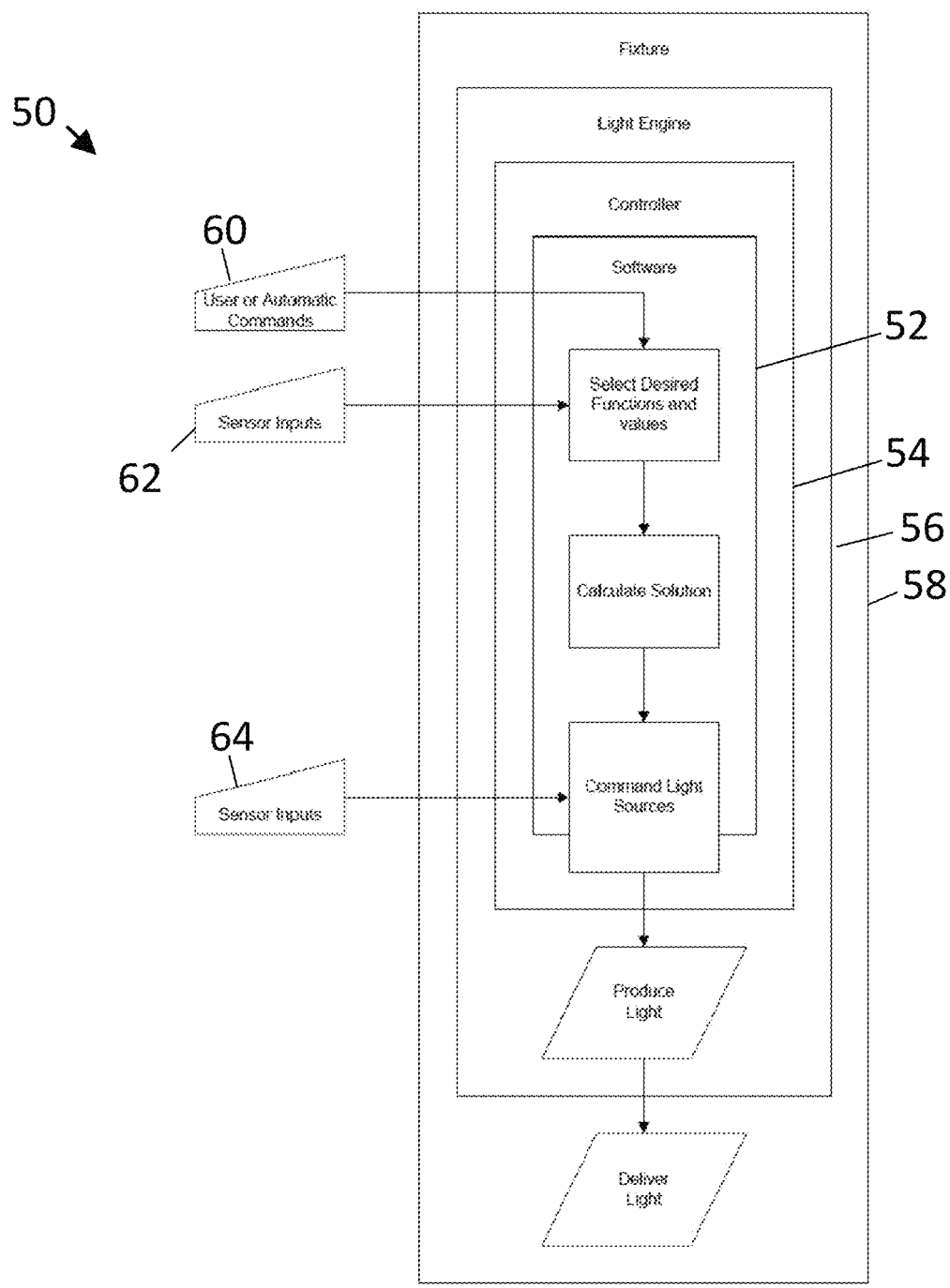
FIG. 4 is a control diagram for lighting systems, such as those presented in FIGS. 1-3.

Referring to FIG. 4, a generalized system 50 can be designed in software 52 running on a controller 54 in a light engine 56 that can be held in a fixture 58. The software can receive control inputs 60 and sensor inputs 62 of different types, such as on/off, illumination level, biological attribute, and/or calibration inputs to select desired functions and values for the system that can be used to calculate a signal to drive the light sources. Sensors, such as feedback sensors 64 can also drive the light sources, such as to compensate for changes in sunlight shining into the illuminated space. The resulting light produced by the light engine can then be delivered to the space.

Figure 5:
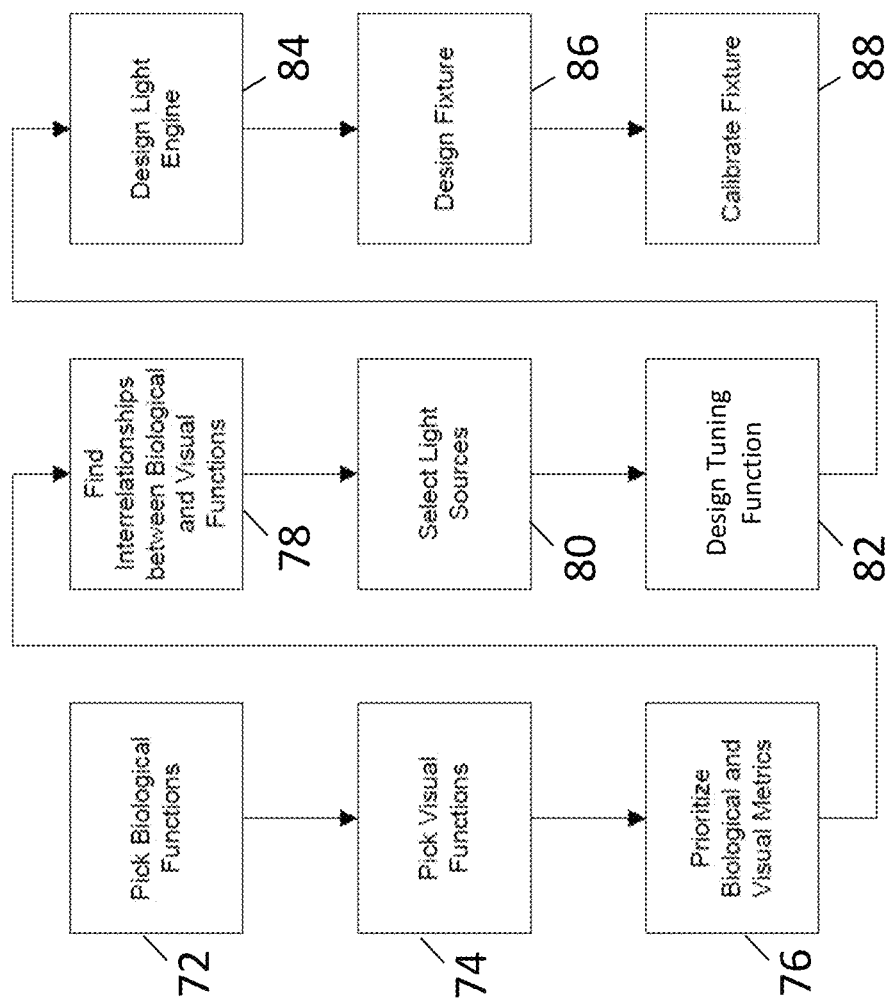
FIG. 5 is a block diagram of a design process for systems, such as those presented in FIGS. 1-3.

Referring to FIG. 5, a process 70 of designing a system according to the invention can preferably, but not necessarily, include all of the steps of picking biological functions 72, picking visual functions 74, prioritizing biological and visual metrics 76, finding interrelationships between biological and visual functions 78, selecting light sources 80, designing a tuning function 82, designing a light engine 84, designing one or more light fixtures 86, and calibrating those fixtures 88.

Discussion

Figure 6:
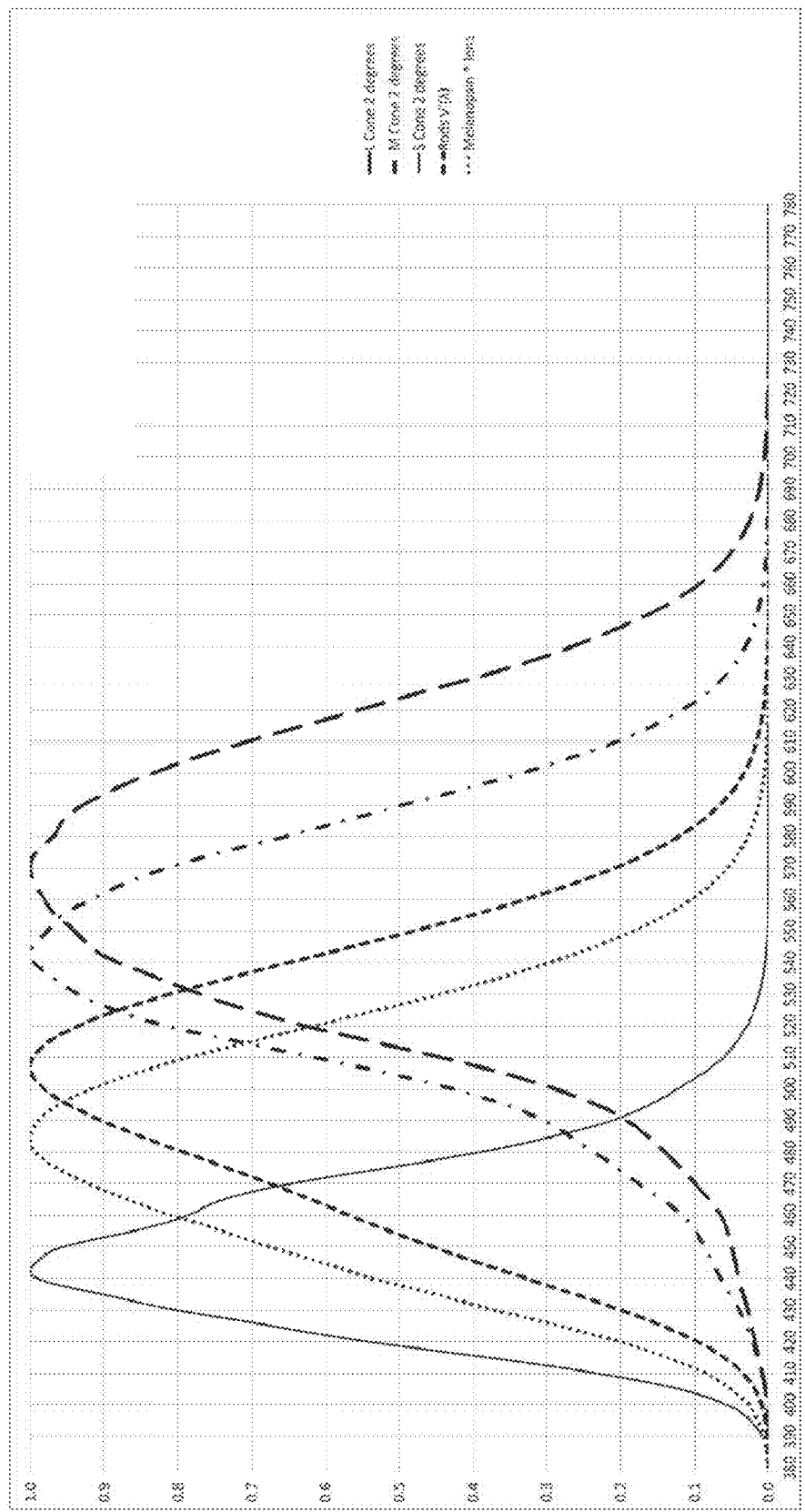
FIG. 6 is a graph of photoreceptor response against wavelength for cones, rods, and melanopsin * lens in the human eye.

FIG. 6 is a graph 90 of the textbook spectral response of human photoreceptors for the L, M and, S cones, rods, and Melanopsin * lens. The X axis is the wavelength of the light in nanometers and the Y axis is the relative response of the photoreceptor.

Intrinsically photosensitive retinal ganglion cells (ip-RGCs) were recently discovered in the human eye. They are not thought to contribute to vision but do have biological effects and their functions are still being discovered. They join the previously known image producing rods and three types of cones. Research has discovered biological effects from a range of light spectra that excites the ipRGCs and the rods and cones in particular ratios or intensities. Some theories specify that one or more of the human photoreceptor outputs are combined and processed to produce biological effects. There are competing theories with accompanying formulas that describe biological functions such as synchronizing the biological clock to the time of day for improved sleep, increasing alertness and improving mood. Many more health effects have been proposed and are being investigated. There is evidence that the intensity, time of day and the duration of the spectral exposure is important.

There are visual, biological, economic and energy usage functions (light functions) that characterize a light source and the human response to it.

a. Visual functions include:
  i. Brightness perceived by humans, often expressed in Lux (lx). Commonly available, simple to operate and inexpensive light meters are typically used to measure this and it is a function of both optical power and wavelength. Some light meters produce incorrect results when measuring narrow band light sources or light sources with strong spectral components outside of the main body of the human brightness sensitivity curve.
  ii. Spectral Power Distribution (SPD) describes the optical power per unit area per unit wavelength of illumination. All visual and biological metrics can be calculated from the SPD of the light measured at the eye or other reference points. SPD can be absolute, which includes intensity and thus perceived brightness. Or relative, which is normalized to unity intensity to just describe relative optical power distribution over wavelengths, which is more related to color. 380 nm to 780 nm is commonly considered to be the range of human vision. SPD is measured by optical spectrometers which are complicated and expensive and thus used much less frequently than light meters by lighting professionals.
  iii. Human color vision allows discriminating between colors, but colors are a construct of human perception rather than being rigorously defined by physics. Colors can be chosen for aesthetic appeal or as a means of communication. The SPD of the illumination affects how humans perceive the color of objects and can cause color confusion or failure to produce the intended effects. There are a number of metrics that attempt to calculate how accurately humans can perceive colors under artificial light compared to natural light such as sunlight. The most commonly used metric is presently the Color Rendering Index (CRI) but there are a number of newer metrics attempting to address its flaws by augmenting or replacing CRI.
  iv. Color temperature (CCT) is a widely used and well understood measure of whether light has a warm-red, to cool-blue, tint. For example, candle light has a warm CCT while daylight at noon has a cool CCT. Lower CCT numbers are warmer. There are light sources that don't have a valid CCT, some of which produce meaningless CCT numbers while others produce CCT numbers of less accuracy that are still meaningful.
  v. Cyanosis Observation Index (COI) is a measure of how well the SPD of the illumination allows detecting a lack of oxygen in humans by observing their skin color. There are standards that specify the minimum of some visual metrics during patient examinations.

b. Biological functions include:
  i. Seasonal Affective Disorder; depression that can occur due to lack of sunlight during the winter.
  ii. Circadian entrainment; the SPD and timing help set the timing of the biological clock and thus can affect the quality of sleep and other cyclical functions such as alertness.
  iii. Studies have shown that certain frequencies of optical flicker (such as 40 Hz) can produce a positive biological effect in mice of reducing Alzheimer's disease pathology. Research is ongoing in humans and has shown reduced subjective sleepiness in one study.
  iv. A study in humans found that brief daily exposures to 670 nm red light produced improved vision for those over the age of 40. There are claims that red light of similar wavelengths improves skin health.
  v. Plant growth and flowering are strongly affected by the SPD and timing of light.
  vi. The SPD and timing of light can also affect animal growth and egg and milk production.
  vii. Light with wavelengths near 405 nm are considered relatively safe visible light instead of potentially harmful ultraviolet (UV) and have been shown to kill some mold and bacteria.

c. Energy usage is the power required to produce the light output and to power optional sensors and user inputs and displays.

d. Economic includes:
i. Cost of electricity to power the lighting; both to the consumer and producer of the electricity.
ii. Cost of producing, selling and purchasing the light source.
iii. Worker productivity can be affected by the illumination provided for performing the task.

Biological goals and most light quality metrics are still subject to at least some dispute. Once biological effects of light were discovered generations of "healthy lighting" have appeared on the market attempting to satisfy the new requirements. Typically once the light leaves the factory it cannot be updated to take advantage of advances in our understanding and such lights are less effective in conducting experiments to understand the biological functions because they typically don't allow much targeting of individual photoreceptors.

The most mentioned biological effect is apparently circadian entrainment; synchronizing the human biological clock to a desired sleep wake cycle to make it easier to go to sleep and stay asleep. Most theories suggest more blue light in the morning and less in the evening. Note that the color blue is a human perception and not a specific SPD.

There is broad agreement about the typical spectral response of the eye's photoreceptors presented in FIG. 6. The photoreceptors have different response peaks but having relatively broad response curves also have significant overlap such that a given wavelength of light can stimulate multiple photoreceptors to some degree.

Figure 7:
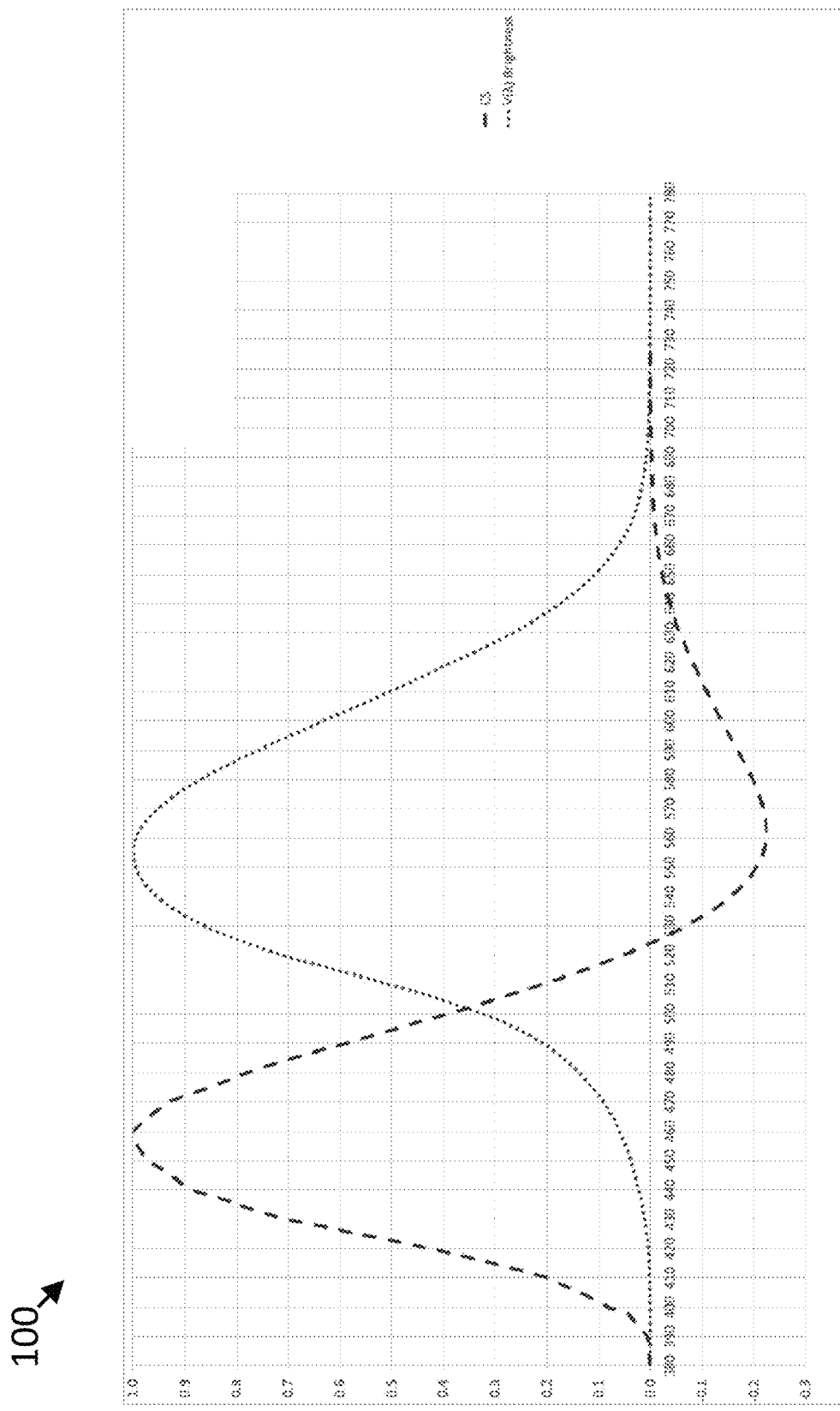
FIG. 7 is a graph of spectral response of human perception of brightness and the Circadian Stimulus (CS) wavelength sensitivity function for cool light from The Lighting Research Center (LRC) as of 2020.

FIG. 7 is a graph 100 of the textbook spectral response of human perception of brightness and the Circadian Stimulus (CS) wavelength sensitivity function for cool light from The Lighting Research Center (LRC) as of 2020. The Melanopsin * lens function is used for warm light CS sensitivity. The X axis is the wavelength of the light in nanometers and the Y axis is the relative human response. Note that other circadian stimulation theories may have different response curves. These curves illustrate that human visual and biological sensors are broad band and can have sensitivity peaks at different wavelengths.

There are a variety of theories such as CS and equivalent melanopic lux (EML):

$$CL_A = 1{,}548 \left\{ \int Mc_\lambda E_\lambda d\lambda + a_{b-y} \left( \int \frac{S_\lambda}{mp_\lambda} E_\lambda d\lambda - k \int \frac{V_\lambda}{mp_\lambda} E_\lambda d\lambda \right) - a_{rod} \left( 1 - e^{\frac{-\int V'_\lambda E_\lambda d\lambda}{RodSat}} \right) \right\}, \quad b-y > 0,$$

$$CL_A = 1{,}548 \left\{ \int Mc_\lambda E_\lambda d\lambda \right\}, \quad b-y \leq 0$$

$$CS = 0.7 - \frac{0.7}{1 + \left(\frac{CL_A}{355.7}\right)^{1.1026}}$$

where, $$b-y = \int \frac{S_\lambda}{mp_\lambda} E_\lambda d\lambda - 0.2616 \int \frac{V_\lambda}{mp_\lambda} E_\lambda d\lambda$$

$CL_A$: Circadian light, $E_\lambda$: light source spectral irradiance, CS: Circadian stimulus, $Mc_\lambda$: melanopsin sensitivity (corrected for crystalline lens transmittance), k=0.2616, $S_\lambda$: S-cone fundamental, $a_{b-y}$=0.7, $mp_\lambda$: macular pigment transmittance, $a_{rod}$=3.3, $V_\lambda$: photopic luminous efficiency function, RodSat=6.5 Wm$^{-2}$, $V'_\lambda$: scotopic luminous efficiency function.

EML=$Km\int Ee,\lambda(\lambda)$Nmelanopic$(\lambda)d\lambda\cdot\int V(\lambda)d\lambda/\int$Nmelanopic$(\lambda)d\lambda$, where,
    $\lambda$ is the wavelength of the radiation
    Km=683.002 lm/W, the maximum spectral luminous efficacy*
    $V(\lambda)$ is the spectral luminous efficacy* function for photopic vision
    Ee,$\lambda(\lambda)$ is the spectral power distribution
    Nmelanopic$(\lambda)$ is the melanopic sensitivity curve with arbitrary normalization.

These theories specify certain human responses to the SPD of light and suggest how to deploy various SPDs as a function of the time of day. They are generally intended to improve the circadian entrainment of the biological clock and thus human health and wellbeing. Most circadian entrainment theories specify that there should be a period of high circadian stimulus early in the day and circadian stimulus should be limited later in the day. This means some spectral characteristics that are biologically desirable in the morning can be undesirable in the evening. By contrast, the requirements for good quality lighting for visual tasks are usually not considered to change over the course of the day.

Research is ongoing and consensus about the optimum timing, brightness and SPD has not yet been achieved. There is broad agreement that one or more biological sensors help entrain the biological clock to the day night schedule and that it should be possible for equations to be written to describe the SPD, intensity and timing of the light that produce a biologically desirable entrainment.

Theories like CS are based on the intensity of the biologically active SPD. Thus, if the distance of the observer from the light source and the distribution of the light are known, the resulting biological stimulus at a given location may be predicted. But attempting to achieve the desired stimulation by simply increasing or decreasing the intensity of a typical broad band white light until the stimulation goal is achieved may not be sufficient. This simple solution may be problematic because it can require too much brightness for comfort when high stimulation is required and too little brightness for performing tasks when low stimulation is required. Too much or too little brightness is apparently subjective and unique to every human and can also vary by the task performed and the delivery of the light. The common use of a display often causes a preference for lower brightness than when working with paper, as was normal when the original office lighting standards were developed. Energy efficiency concerns can also make high brightness undesirable. Humans are quite tolerant of very high brightness when outdoors, but the much more uneven delivery of light indoors can cause eye strain and painful glare at high brightness. Low brightness can make it hard to see the detail required by some tasks and many people will feel that it is undesirable even when it does not hurt their performance.

Humans can also have preferences about the CCT. They generally prefer light sources that render colors in a way they find pleasing. Pleasing may or may not be the same as accurately depending on the task.

Some states and countries have energy use codes that limit the amount of energy that can be used for lighting homes and offices. The cost and availability of electricity can also vary by time of day and season. Generation and transmission resources can go off line, wind and solar can lose capacity based on the weather and consumer demand can spike due to temperature. These factors can lead to economic motivation to lower energy usage or a requirement that energy usage be lowered to avoid blackouts. These pressures from the electric utility to lower consumption are known as demand response (DR). Lighting is a major consumer of electric power and can often be cut back to reduce power consumption during a DR event.

Some installations use indirect lighting where the emitted light is reflected from surfaces like walls or ceilings into the space. This type of lighting tends to produce less glare. The typical surface colors and finishes will alter the shape of the SPD by selectively reducing some portions of the SPD more than others. It is believed to be uncommon for the lighting installer to understand the spectral changes produced by reflections. Indirect lighting can be used in combination with direct lighting.

Human perception of visual light quality is based on light reflected from objects. Light shining into the eye directly from a light source does not to the first order affect the perceived reflected light quality. There is opportunity to deliver biologically active light directly to the eye independently from the lights sources used for general illumination in order to decouple and independently optimize visual and biological functions.

Optical spectrometers can measure the SPD of light sources and watt meters can be used to simultaneously measure the electrical power that generated that optical power measured in the SPD. In combination it is possible to predict from these measurements the biological function, optical function and electric power consumption of the light source if the optical path to the observer is known or measured.

LEDs and other light sources typically decrease the amount of light they produce as they age. The intensity and SPD of the light can change with temperature and the method and level of dimming. For LEDs, dimming is usually done by pulse width modulation (PWM) that turns a drive current on and off at a variable duty cycle and produces light pulses that are averaged to appear as a steady light of varying intensity by the eye, or by continuous current who's amplitude varies the optical intensity.

Artificial Intelligence (AI) is a technique for solving problems by training an AI algorithm on a data set of known inputs and outputs. It can find solutions that are not obvious to the humans that presented the problem to the AI.

Dim to warm dimmable lights allows mimicking the lower color temperature and brightness of sunrise and sunset. They can be an improvement over more typical dimmable lighting because the light's SPD changes as a function of brightness. The change to a lower CCT at lower brightness is desirable in many of the theories. The resulting range of SPDs is still not sufficiently optimized and will often need to be inappropriately dim or bright if set to produce the desired circadian function.

Day/Night mode lighting has two SPDs of broadband white light that are enhanced to provide either more or less circadian stimulation while still appearing as "normal" white light. Existing examples do this by using a high and a low circadian function LEDs typically at very different CCTs for the day and night settings. This is an improvement over the previously mentioned types of lighting in that it is designed to enhance biological responses and can have a timing component to match the desired schedule. This solution often requires too little or too much brightness to be acceptable while providing the desired biological function. It is typically not possible to change the biologically active part of the SPD independently of the CCT and thus some people may find the resulting CCT undesirable.

It is desirable that a light source would be able to provide biological functions completely independently from visual functions. But spectral overlap between the human visual and non-visual systems combined with the competing requirements mean that biological and visual goals are to some degree in conflict. The biological functions and light quality metrics use the various human photoreceptors in different ways and can present tradeoffs when maximizing one function that may penalize another. The more different light source spectrums available, the more the resolution in spectral tuning, the less severe the tradeoffs can become. The SPD can be shaped to avoid the worst penalties in light quality metrics while being near the highest or lowest sensitivity for the biological functions as desired.

It is often possible to achieve desired biological functional goals simply by setting the brightness of a broad band white light source. This often results in too little or too much brightness for visual purposes. A better solution is to use multiple light sources that allow at least some independence in adjusting the brightness, the light's visual quality and the biological functions. For example, due to eye photoreceptor spectral overlap it is impossible to make CS entirely independent from visual brightness and light quality. But it is possible by using multiple light sources with different SPDs to greatly reduce the required change in brightness and/or visual quality over only changing a broad band white light sources brightness when providing high and low circadian stimulus.

Circadian Tunable Light Sources (CTL) can use at least two light sources with different SPDs. This allows producing multiple SPDs after installation rather than having a single SPD fixed prior to installation. The multiple SPDs more selectively stimulate the eye's photoreceptors. Different light sources can produce SPDs that contribute preferentially to brightness, biological function or visual quality. Light sources that contribute to a sensitive region of one light function and an insensitive region of a conflicting light function can be the most useful. The light sources optical power are optionally independently controlled. This allows semi-independently setting the values of light functions to minimize unwanted tradeoffs. A typical goal is achieving a biological function while maintaining a reasonable brightness and quality of visual light.

Systems according to the invention can be viewed in different ways, including:
- A process: Select or design light sources that will allow meeting a desired range of biological, visual, economic, energy efficiency or energy delivery functions through emitting more than one SPD as needed.
- A machine: Those light sources can optionally be combined into a light engine, installed in a fixture and allow control and sensor inputs.
- A process: The light sources are commanded or driven to produce the desired SPD based on optionally one or more of a predetermined algorithm, time of day, user and sensor inputs or any other means of control.

The CTL or its control system preferably responds to the selection of visual, economic or biological functions by calculating the best solution it is able to produce to best satisfy the desired functions in order of their priority. Typically a very wide range of brightness and circadian stimulus can be met if no other functions are specified and an appropriate set of light sources are used. The greater the number of functions that are required for a given set of light sources, the greater the chance that not all functions can simultaneously meet their desired values.

Design Process:
Not all of the process steps listed below are required but they represent the presently preferred design (see FIG. 5).
  a. Set goals
    i. Pick a given distance and orientation from light sources to target where light functions will be calculated. The target typically is a surface or area to be illuminated, or a distance and angle to the user or to the user's eyes.
    ii. Pick one or more biological functions to implement. For example CLa, CS, EML and blue light ratio functions.
    iii. Identify which photoreceptors will be targeted and ranges of stimulus required. For example the rods, cones and ipRGCs.
    iv. Select range of visual brightness required. Typically illuminance in lux (lx) or foot candles (fc).
    v. Pick which visual quality metrics are required or desirable and their required ranges. For example CCT, CRIa, CRI 1 through 15, Gama Area Index (GAI), Duv, TM-30 Fidelity Index (Rf), Gamut Index (Rg), Local Chroma Shift for nominally red objects (Rcs,h1 or Rcs,h16).
vi. Decide whether there are energy efficiency or cost of production, installation or operation constraints.
vii. Prioritize with respect to each other biological metrics, visual brightness, light quality metrics, energy efficiency and economic metrics.
viii. Define metrics of suitability for proposed solutions so that multiple proposed solutions can be compared. The metric can include pass/fail tests and numerical values. Determine the range of the metrics of suitability that are required.
b. Select a set of proposed light sources
i. Examine the equations and response curves of the selected photoreceptors, visual and biological functions and other metrics of interest to identify areas of SPD conflicts between requirements and areas where optical energy can be added to achieve particular goals without diminishing other goals. This can often be done by using a computer to graph together the equations and response curves. Note where possible the wavelengths that provide the most or least biological function or other metrics of interest. Sometimes it is possible to derive formulas to calculate the SPDs of the light sources needed to meet all of the requirements but typically it is necessary to use a computer calculate the effectiveness of a trial set of light sources.
ii. Typical targets for selecting or creating light sources include
1. Wavelengths that contribute relatively little to visual perceived brightness but contribute heavily to desired biological functions.
2. Wavelengths that contribute heavily to visual perceived brightness but contribute little to the biological functions.
3. Wavelengths that contribute to improving light quality metrics but contribute little to visual and/or biological functions.
iii. Narrow band single color, broad band single color and broad band white light sources are commonly available and should be considered for applicability. Light sources may be selected from commercially available products or custom designed. When selecting from commercially available products it is useful to capture the SPD and optical efficiency from the data sheets or find them by measurement.
iv. Broad band white light sources that produce an SPD similar to daylight or incandescent light will provide the best light quality metrics from a single light source and can be a good starting point to build on by adding narrow band light sources to enhance desired biological characteristics while not unduly reducing the light quality metrics. Narrow band light sources of desirable wavelengths added to a broadband white light source can produce higher CRI than the white light source alone and can alter its CCT.
v. If only narrow band light sources are used for maximum SPD tunability, then at minimum there should be light sources that contribute red, green and blue. It will take more than three narrow band light sources to produce good color quality as measured by CRI for example. The smaller the wavelength gaps between light sources the higher the color quality can be.
C. Verify the light sources and determine the required optical outputs from the light sources
i. Once a set of light sources has been tentatively selected it is necessary to verify they can be tuned to meet the desired goals and to discover how to tune them to produce the range of desired functions.
ii. For biological functions that should be high during one period of the day and low during another period of the day it is usually only necessary to verify the suitability of the set of light sources at the high and low extremes. It is usually not necessary to verify all possible combinations in between.
iii. This can be done by using a computer to allow trying different combinations of light source optical power added together to produce an SPD as inputs to the light functions and calculating the desired functions and checking the metrics of quality for each combination of light sources. Each of these input and calculated output combination is a vector. A collection of these vectors is a solution data set.
iv. A computer can be used to generate a large number vectors randomly or try all possible vectors at a given light source command resolution or calculate the results for human or algorithm guided trial and error generation of SPDs. Preferentially only the vectors that produce function output solutions that meet the required metrics of suitability are saved to the solution data set. The random process can be stopped after the suitability of the light sources is verified and a large set of vectors is produced that can be used to tune the CTL. Knowledge of the equations and analysis of the results as they are being calculated can be used by programs to shorten the computational time by not evaluating some SPDs in areas producing poor results and trying more vector inputs in areas producing favorable results.
v. If the required metrics of suitability for the high and low biological functions are not met then it is necessary to select more or different light sources and try again.
vi. If the required metrics of suitability are met, then it is necessary to be able to calculate control solutions to be able to command, drive or switch the light sources to produce the desired optical outputs. This can be to produce factory preset values or values in response to user, sensor or system commands. Control solutions can be calculated for factory presets or to satisfy user commands beforehand and store them in the CTL or the control system, or calculate the solutions in real time in the CTL or its control system. If the CTL or control system will be calculating the control solutions, it can save time to anticipating the next possible or likely user inputs and pre-calculate the solutions.
vii. Calculating the control solutions for the light sources can be performed using a computer to
1. find a vector in the solution data set that is close enough to the required solution.
2. find a vector in the solution data set where all the light source powers can be multiplied by the same scaling factor to be close enough to the required solution.
3. find two vectors in the solution data set who's solutions closely bracket the required solution and interpolate a vector that will produce the required solution.
4. use curve fitting to derive a closed-form equation calculating the required solution from the command inputs.
5. train AI on the solution data set to produce a solution from the command inputs.
d. Design the fixture and determine the required electrical inputs to the light sources i. The selected light sources should deliver at least the highest optical power required by the vectors that will be used to the target. The fixture design determines the optical transfer function of the delivery of the light from the light sources to the target. Working backwards from the target, typically the fixture's light distribution can be designed or selected to calculate the optical power required from the light sources as understood by those skilled in the art.

ii. It is possible to calculate how many of each light source are required to provide the needed optical power while staying under the maximum desirable optical power for each light source. This is the minimum number of each unique SPD light source. Requirements for fixture light visual uniformity may require more than the minimum number of each light source as known to those skilled in the art.

iii. Once the number of each unique SPD light source and their range of optical power is known it is usually necessary to select or design a driver to electrically power them over the desired optical power range.

1. It is common to arrange the multiple light sources of the same SPD into series wired strings.
2. Typical light sources will have a voltage drop range over the required range of optical power operation. It may be desirable for safety, regulatory or economic reasons to limit the maximum voltage applied to a series string of light sources and thus it may be preferable in some cases to have multiple strings of light sources of the same SPD.
3. As known to those skilled in the art, design or select drivers for each light source, or string of light sources, that provide the range of voltage and current required in operation. it may be possible to parallel multiple strings of light sources of the same SPD if desired.

iv. In the CTL there is at some point an output command to each light source that leads directly to setting their contribution to the SPD the CTL produces. The output command may use scaling and typically other mathematical operations to map between the selected or calculated vector and the production of the desired SPD at the target. The output command translation equation will be calculated or measured for each light source by methods known to those skilled in the art such that the desired SPD can be produced at the target after taking into account the electrical and optical transfer functions of the light sources, drivers, the fixture and any other relevant transfer functions.

v. Additional correction factors can be applied before the output command to correct the SPDs for predictable non-ideal light source behaviors due to things such as run time, temperature, drive PWM percentage and current. These effects can change the amplitude and the wavelength of a light source for example.

1. The variables that can change the SPD are calculated, measured or estimated and a corrected command to SPD transfer function is calculated for that light source. To the degree that the wavelength changes are small or the correction only affect the optical power, it may be possible to change only the command to the light source that is affected.
2. It may be possible to capture those SPD changes as a formula or the CTL or its control system can store sets of SPDs for each of the light sources that include the corrections.
3. This method can improve the accuracy of the delivered SPD without requiring real time optical sensors.

vi. As covered in other parts of this application, the designer may include user interfaces, timers, sensors and control systems as part of the CTL design process.

Indirect Use

The CTL can be installed to have a direct optical path to a target, and/or it can use reflections from walls, furnishings or ceiling to provide an indirect path. Indirect paths introduce spectral distortion unless the surfaces reflect all wavelengths of light equally. The spectral distortions of indirect usage can be large enough to require accounting for them during the design phase or by calibration when installed or by continuous calibration. The system may be able to compensate through optional closed loop control for any alteration of the SPD by the surfaces the light is reflected from by increasing the necessary spectral components that have been reduced from the desired value by the reflecting surfaces. Alternately the CTL could alert the installer or user to change the reflective surface treatment or move or re-aim the CTL to improve the efficiency of delivery of the desired SPD.

Calibration

A higher accuracy of delivered SPD can be achieved by calibrating the SPD at the target. This accounts for non-ideal light source effects like component variation, component aging and temperature changes, as well as the reflectivity of surfaces within the room or the fixture or changes to the reflectivity of surfaces within the room or the fixture. If calibration is performed continuously it can also correct for light from other sources.

Calibration may be performed upon installation, and as desired, by use of a sensor that a user inputs into to the CTL or that communicates to the CTL directly. Calibration may also be performed by one or more continuously used sensors that are either located at the target or have a known relationship to it. Calibration can be accomplished by finding the ratio between the expected SPD and the actual SPD and calculating correction factors that are applied to the output commands to the individual light sources.

The possible calibration methods can depend on whether or not any unique SPD light sources in the CTL have overlapping SPDs. If there is at least one overlap, it may be necessary to calibrate each overlapping light source individually. This will involve putting the CTL into a calibration mode or routine as opposed to calibrating in normal usage.

If there is no overlap, it is possible to calibrate the CTL during normal usage with a spectrometer. It is also possible to use an inexpensive multispectral channel light sensor if there is at least one sensor spectral channel that sees just one of each of the light sources. In the case of the multispectral channel light sensor it may be necessary to perform a one-time calibration of the sensor for each light source by comparing the sensor to a spectrometer. The CTL can be calibrated for direct, indirect or a combination of direct and indirect use. This calibration can correct for the spectral distortion of indirectly reflected light from the CTL. In the case where there is not at least one unique sensor spectral channels per light source, the light sources can be turned on for calibration individually or in groups that can be individually discriminated.

It is possible to calibrate the CTL for indirect or direct/indirect usage with a typical low cost light meter by putting the CTL into a calibration mode or routine as opposed to calibrating it in normal usage. A typical low cost light meter has only one spectral channel and may be accurate only for high CRI broad band white light sources, but can be used for other light sources in a relative way:

a. Place the light meter with only a direct view of the CTL at the same distance from the CTL to the target as will occur in normal usage. Aim the light meter directly at the CTL to capture the maximum light.
b. Make sure there are no other lights visible to the light meter that can interfere.
c. In turn, set each of the CTL's unique SPD light sources to maximum power. Record the measured Lux for each unique SPD light source.
b. Now place the light meter where the target would be, facing in the direction the target is defined to face.
c. In turn, set each of the CTL's unique SPD light sources to maximum power. Record the measured Lux for each unique SPD light source.
d. Divide each at location reading by the direct view reading to get the reflective surface calibration ratio. The ratios are a measure of the reflecting efficiency of the surface and may suggest the need for changing the surface.
e. Any measured discrepancy from the predicted optical power of a given light source can be divided into the output command for that light source to produce a corrected optical power that will meet the expected value.
f. It is possible to use sensor inputs to close the loop in a negative feedback system where the functions of interest are calculated from the sensor inputs and the output commands are varied by computer software until the desired functions are achieved, as understood by those skilled in the art of closed loop control. Closed loop control can regulate multiple functions to their desired values within the limits of the CTL's tunability. A preferred example is to regulate the lux and the circadian stimulus at the target.

Sensors, inputs and interfaces providing information to the CTL or its control system can be used to increase the accuracy of the SPD produced, or affect the choice of SPDs to be produced. Sensors, inputs and interfaces include time, date, optical spectrometers, multispectral channel light sensors, single spectral channel light sensors, occupancy sensors, demand response inputs, building management system inputs, current sensors, wattage sensors, temperature sensors, serial busses, wireless and cellular interfaces. They can be permanent parts of the system or present only when needed.

Controls

Referring to FIG. 4, controls are used if there is more than one SPD produced to satisfy the desired functions.
ii. Sensors and user inputs can be used as control inputs.
iii. Outputs may be needed to help users use and diagnose the system.
iv. The selection of the desired the values of the functions can be performed automatically, fully manually by user inputs, or a semi-automatically by a combination of both. User inputs may allow the user to permanently or temporarily override the automatic control. The selections may be made at any point from manufacture to an installed product or system.

Controls can affect, but are not limited to:
i. visual functions such as
1. brightness, color quality such as CRI, light color such as CCT.
2. light colors such as red and amber which can be used as a night light to provide adequate vision for navigation without decreasing dark adapted eye high light sensitivity.

ii. economic functions such as
1. reducing the power consumed by the CTL by limiting optical power that contributes to less critical functions.
2. reducing the power consumed by the CTL by changing the vector to a more energy efficient one that produces adequate brightness at the expense of other function goals.

iii. biological function such as
1. circadian stimulus
2. alertness
3. mood
4. providing exposures of red light to improve vision and improve skin health.
5. achieving a biological function or signaling by flashing the different wavelength light sources individually, as a group, or in anti-phase to minimize flicker. Flashing at 40 Hz is being investigated as a treatment of Alzheimer's disease and reduced subjective sleepiness.
6. using a wavelength near violet both for use with building the desired SPD of light for the biological function and the user's photopic light preferences when the lit space is occupied and then and can be used to kill some molds and bacteria preferably at higher power when sensors or timers indicate there are no human occupants using the light for illumination.

iv. The user or programming can optionally change the priority of functions when performing certain tasks that have different visual, biological or economic requirements or priorities. Examples include an examination room may prioritize meeting the COI standard during exams or an office may prioritize energy savings during a DR event.

v. The CS theory postulates cool and warm CS such that CS is most sensitive to either cool CS centered at 460 nm or warm centered at 485 nm. Cataracts can selectively attenuate the shorter wavelengths of light more than longer wavelengths. Switching from cool CS to warm CS allows more CS to reach the receptors of cataract suffers. The light sources can be commanded to tune to provide warm CS for cataract sufferers. This provides more stimulation due to less attenuation and less uncertainty of the amount of delivered stimulation due to less attenuation.

Typical examples of automatic operation include:
i. A preferred automatic implementation can use a time clock to automatically select between a high circadian stimulus from morning till evening and low circadian stimulus from evening till morning. The visual brightness can be selected for each time period based on industry recommended illumination levels. The visual and economic metrics can be preselected as desired. The CCT, for example, may be higher during the morning to evening and lower the rest of the day to mimic natural light, or it may remain constant. The circadian stimulus can be at least at a high level during morning till evening and less than a low level the rest of the day, where high and low level values depend on which theory is being implemented.

Typical examples of manual and automatic operation include:
i. The user sets the brightness and indicates a preference for CCT. The system automatically schedules the circadian stimulus to be at least high level during morning till evening and less than a low level the rest of the day. The system always honors the user's brightness command but makes providing the user commanded CCT and the pre-programmed minimum CRI a lower priority than providing the circadian stimulus. If a demand response event occurs, the system cuts power to the parts of the spectrum that don't contribute to brightness so that the user can continue to work but may not receive the desired CCT, CRI or biological functions.
e. AI can be used to learn user preferences and schedules and automatically provide the desired control settings.
f. The software and settings of the CTL and its control system can optionally be updated at any point from manufacture to installed to use newer or different metrics or functions. This can be done through the use of connectors, wirelessly, changing components or changing removable media. This is especially advantageous as the field of biologically active light is very active with frequent updates to formulas and goals.
g. CTLs optionally can record the SPD and timing they provide to people who are exposed to their light. This record can be shared with the system or other CTLs to allow providing the desired total dose of biological function to a person who moves between CTLs. The person does not need to wear a light sensor capable of discriminating the provided SPD. The CTLs can optionally have occupancy sensors and blue tooth, wi-fi or similar radios capable of recognizing that someone is being illuminated and detect who they are by detecting their cell phone. A simple occupancy sensor is can be used if the system of CTLs has knowledge that a particular person is likely to be the one who's occupancy has been detected. Alternately image recognition can be used to identify the person and that they are within range of a particular CTL.

User Interface
a. All functions of the CTL can optionally be controlled by the user if desired and can provide status and feedback to the user. The user interface to the controls can be implemented by any suitable method including switches, sliders, displays, audio annunciators, touch screens, keypads, buttons, voice, gesture recognition, or machine vision.
b. The user interface to the controls can be
 i. mounted on the wall, furniture or be portable.
 ii. computers, cell phones and tablets running programs to provide user interfaces to the CTL or its control system.
 iii. located locally or remotely.
 iv. lists, menus, numerical, absolute or relative values of the controlled functions.
c. The user can be alerted to the presence of too much of certain spectral components from neighboring light sources that result in inappropriate or harmful biological function, such as too much CS at night.

The CTL is typically part of a fixture. An external control system can provide better locations for sensors and user inputs. If calculations are required, they can be performed in the system or the CTL. There will typically be multiple CTLs per system and the calculations may require more memory than is typically available in inexpensive microprocessors, so it can be economically and product size advantageous to do most or all calculations at the system level. System level controls can avoid duplication of information like the time of day for scheduling with a single system wide clock instead of a clock in every CTL. Systems that don't need to share sensor data between CTLs may be simpler to install and commission and more economical when the sensors hook directly to the CTL or are embedded in the CTL.

The CTL can be used to advance or delay biological clocks by applying Melatonin suppressing SPDs with appropriate timing. This could be used to reduce or eliminate the effects of jetlag by adjusting the viewer's internal clock more gradually in advance of travel or daylight savings time change. CTL used to adjust the biological clock can be installed in suitable locations for travelers, such as airplanes, hotel rooms, airports or be personal lighting devices.

While there are manufacturing and installation advantages to locating all of the controlled light sources in the same fixture, wired or wireless control links can be used to coordinate light sources in multiple locations intended to illuminate the same user or area. Using light sources in multiple locations is especially advantageous if it is desired to place the biologically significant light sources directly in front of the user to assure unobstructed delivery to the eye. This also can save power if the biologically significant light sources have a shorter path the eye than if they were located in the ceiling. Separate locations can improve the visual quality of the portion of the light sources intended primarily for general illumination as they no longer need to prioritize biological stimulation.

Example 1
a. A CTL is designed as a 2 foot by 4 foot direct illumination troffer to illuminate 64 square feet in an open office with 9 foot ceilings with a target of a work plane height of 30 inches above the floor centered under the fixture. All light function calculations are performed at the work plane.
b. The CRI is specified to be 70 or greater as the highest priority.
c. The CCT must be between 1,000 k and 10,000 k as the next highest priority.
d. The user can specify the brightness of 0 to at least 300 lx at the target as the next highest priority. Brightness's between 100 and 300 lx must be able to achieve the desired CS values.
e. LRC's CS theory is used. The time of day specifies the minimum or maximum CS as the next highest priority and is scheduled to deliver CS of 0.1 or less except between 8 am and 5 pm when a CS of 0.3 or more is delivered. A CS of 0.1 is a CLa of 70 and a CS of 0.3 is a CLa of 274.
f. The user can specify the CCT within the allowed range as the next highest priority.
g. The highest CRI among multiple acceptable solutions will be used.
h. A high level of CS suitable for morning to evening can have a very large range of possible CCT when a high brightness is commanded, but may limit the range of CCT to cool when a low brightness is commanded. This can occur because "blue" light contributes most powerfully to producing CS and also causes the CCT to be cooler. At high brightness levels the required blue light can be balanced by the other portions of the spectrum to allow a broad range of CCT while still satisfying the CS, Lux and CRI requirements. At low levels of brightness the bluer portion of the SPD required to produce the high level of circadian stimulus can use up enough of the allowed brightness that it is only possible to produce cool CCTs. The CCT may be higher than the user specifies in order to meet the lux and CS requirements.
i. Commonly available LEDs will be used to avoid large development costs. This limits the choices of wavelengths to be near the desired wavelengths but not exact.

j. Note from graphing response curves of visual and biological response (FIGS. 6 and 7) and finding the SPDs of commonly available LEDs that
  i. The peak CS is at 460 nm.
  ii. The peak visual brightness response is at 555 nm.
  iii. When the CS is "cool" the peak subadditive (reduces CS) response is at 560 nm.
  iv. CRI is higher for white light sources that cover the visual range than for individual narrow band sources. But adding narrow band sources can improve the CRI of white light sources when they make up for deficiencies in the white source.
  v. White LEDs tend to have a blue peak that contributes to a higher CS and the blue peak is typically less for lower CCT white LEDs. 3 k CCT and 5 k CCT white LEDs are commonly available and can be used singularly or blended to produce high CRI light with CCTs of 3,000 k to 5,000 k. The 3,000 k white LED can be selected to contribute relatively less CS than the 5,000 k LED at the same brightness. Their range of biologically active to photopic light will insufficient for many required function combinations so they can be supplemented by narrow band emitters.
  vi. 405 nm is a commonly available LED that contributes 15% to cool CS but almost nothing to lux. It also is a shorter wavelength than is typically produced by white LEDs and thus can improve the CRI. It can be used in forcing the CS formula to use the cool CS branch of the equation without significantly increasing the lux.
  vii. 475 nm is a commonly available LED that is 80% effective at generating CS and 10% for lux which increases the CLa to lux at an 8 to 1 ratio and is thus useful when large amounts of CS are required with lower lux levels.
  viii. 590 nm is a commonly available LED that is 15% effective at reducing cool CS while it is 75% effective for lux so it can be used when high lux and low CS are desired.
  ix. 625 nm is a commonly available LED that is 5% effective at reducing cool CS and 30% effective for lux. Adding 625 nm to white LEDs is often favorable for higher CRI. It can help shift between warm and cool CS.
  x. The above narrow band LEDs 405, 475, 590 and 625 nm allow shifting the CCT beyond the range provided by the white LEDs while still providing good CRI.
  xi. The SPD of the LED under consideration are captured from the data sheets or measured by a spectrometer.
k. LEDs of 405 nm, 475 nm, 590 nm, 625 nm, 3,000 k CCT broad band white and 5,000 k CCT broad band white are used.
l. 100% command is arbitrarily specified to be 10 optical watts from the commanded LED. Data points are randomly generated that command each LED independently between 0 and 100%, with each set of 6 LED commands being the input part of a vector. The metrics of interest, lux, CS and its precursor CLa, CCT, CRI and CLa/lx are calculated as the remainder of each vector as understood by those skilled in the art. Only vectors with a CRI of 70 or more and a CCT of 1,000 k to 10,000 k are stored. A solution data set of 1 million stored vectors is generated as a compromise between calculation time and having a sufficiently large solution data set to choose from. The lux value of each vector is independent of the desired lux, and will need to be scaled to the desired lux by multiplying each LED command by the same lux correction constant. CLa is a linear function of optical power if the vector is scaled by a multiplier, while CS is logarithmic and thus less suitable for scaling. A CS of 0.3 will result from a CLa of 274 and a CS of 0.1 will result from a CLa of 70.
m. Verify the suitability of the set of light sources at the high and low extremes of CS and lux.
  i. The solution set is sorted by CLa/lx.
  ii. A CS of 0.3 and a lux of 300 has 274 CLa/300 lx=0.91 or more, and that is found in the solution set.
  iii. A CS of 0.3 and a lux of 100 has 274 CLa/100 lx=2.74 or more, and that is found in the solution set.
  iv. A CS of 0.1 and a lux of 300 has 70 CLa/300 lx=0.23 or less, and that is found in the solution set.
  v. A CS of 0.1 and a lux of 100 has 70 CLa/100 lx=0.70 or less, and that is found in the solution set
  vi. It is now known that the set of LEDs can meet the deign goals.
n. Examples of optical power calculations that will be performed in the CTL when installed
  i. At noon the user commands 150 lx brightness with a 3,500 k CCT. The factory programming commands a minimum CRI of 70 and a minimum CS of 0.3 from 8 am to 5 μm. The solution data set is sorted by CLa/lx. 274 CLa/150 lx=1.83, so values near 1.83 are examined for the CCTs nearest 3,500 k. All CLa/lx of 1.825 to 1.835 are sorted by CCT yielding the CCT closest to 3,500 k which is 3,491 k. The selected vector has a lux of 936 and is multiplied by 150 lx/936 lx and the LEDs are set to 16.0%, 5.0%, 1.4%, 5.5%, 11.6%, 9.5% respectively. This produces 150 lx, 0.30CS, CCT of 3,491 k, CRI of 75. All commands are satisfied.
  ii. The user then changes the CCT command to 6,500 k and the brightness to 300 lx. The solution data set is sorted by the CLa/lx, 274 CLa/300 lx=0.91 and values near 0.91 are examined for CCTs near 6,500 k but the highest CCT at that ratio is 4,209 k, so there is no exact match. 0.3CS is the minimum value and higher CS values and thus higher CLa/lx ratios are acceptable. Resorting the solution data set by CCT and examining vectors from 6,450 k to 6,550 k, the lowest CLa/lx available is 1.92, so all vectors in that CCT range will do and the one with the highest CRI is selected. The selected vector has a lux of 403 and is multiplied by 300 lx/403 lx and the LEDs are set to 19.9%, 8.8%, 0.2%, 1.4%, 8.1%, 44.4% respectively. This produces 300 lx, 0.44CS, CCT of 6,485 k, CRI of 91. All commands are satisfied.
  iii. The user then changes the CCT to be 3,500 k and brightness command to continues to be 300 lx.
  The solution data set is sorted by CLa/lx. 274 CLa/300 lx=0.91, and values near 0.91 are examined for the CCTs nearest 3,500 k. All CLa/lx of 0.905 to 0.915 are sorted by CCT yields the CCT closest to 3,500 k which is 3,509 k. The selected vector has a lux of 1,145 and is multiplied by 300 lx/1,145 lx and the LEDs are set to 7.7%, 3.4%, 5.2%, 4.4% 1.7%, 21.1%, 24.5% respectively. This produces 300 lx, 0.30CS, CCT of 3,496 k, CRI of 80. All commands are satisfied.
  iv. At 5 pm, the factory programming commands a maximum CS of 0.1, while the user's commands stay at 300 lx and 3,500 k CCT. The solution data set is sorted by the CLa/lx. 70 CLa/300 lx=0.23. There are no solutions at 3,500 k CCT that are less than CLa/lx of 0.64. The CS must be less than 0.1, so the CLa/lx must be less than 0.23, so the solutions of CLa/lx less than 0.23 are examined for the closest CCT which is 1,025 k. The LEDs are now commanded to 22.4%, 0.3% 11.0%, 37.8%, 16.7%, 0.3%. This produces 300 lx, 0.09CS, 1,025 k CCT, 85 CRI. The higher priority user command of brightness was satisfied, but the CCT had to be lower than commanded to satisfy the higher priority requirements of a maximum CS of 0.1 and a CRI of 70 or more.

o. Find the LED's maximum required optical power from the useful range of the solution data set.
  i. The maximum commands for each LED are 104.94%, 24.26%, 17.74%, 48.57%, 51.72%, 53.27% respectively.
  ii. The optical power output of the LEDs in the solution data set was selected to be 10 W at 100% command. The required optical power is 10 W times the maximum command percentage=10.5Wo, 2.4Wo, 1.8Wo, 4.9Wo, 5.2Wo and 5.3Wo respectively.

p. Find the maximum required electrical wattage of each unique SPD LED.
  i. The data sheets list the optical power and electrical power and allow selecting the maximum electrical wattage per LED operating limit.
  ii. Calculate the maximum optical power needed. For the 405 nm LED, 104.94%×10 W=10.5 optical watts. As understood by those skilled in the art, the optical wattage should be increased to account for any optical power lost in the fixture and possibly device aging, but that is neglected here for simplicity.
  iii. Calculate the maximum electrical power needed. For the 405 nm LED, the LED forward voltage is 3.4V at a current of 500 mA at 25° C. operating temperature which is 1.7 electrical watts which produces 0.93 optical watts per LED. For a conservative design we pick 1.7We as the maximum electrical wattage per this LED. 1.7We×10.5Wo/0.93Wo=19.2 electrical watts. The other LED electrical wattages are calculated by the same process to get the maximum electrical wattage needed for each unique SPD LED as 19.2We, 4.5We, 8.3We, 8.4We, 13.8We and 11.9We respectively.

q. Pick the number of LEDs
  i. For simplicity sake we design to the 25 C values and neglect any temperature rise due to practical limits of heat sinks. Thus we need 19.2We/1.7We=11.3 405 nm LEDs. Round up to 12 each 405 nm LEDs. Fewer LEDs of a given part number can be used if the solutions in the data set that require the most LEDs of a particular part number can be replaced by other solutions that require fewer of that LEDs. Searching for the most economical solutions is an optional step. The quantities of the other LEDs are calculated by the same process to get the required numbers of 12, 5, 11, 11, 4 and 4.

r. Pick the current and voltage of the LED strings.
  i. In this example the maximum LED string voltage will be kept under 24V to eliminate electrical safety concerns and allow the use of a readily available power supply voltage.
  ii. The voltage drop of the 405 nm LEDs at the maximum current to be used is 3.4V at 500 mA and there will be 12 LEDs in the string. This results in 40.8V total across the string, so two strings of 20V are needed to stay under 24 v. We earlier calculated we need 19.2We, so each string gets half of that. Which at 20.4V requires 470 mA. By the same process we calculate the remaining LED strings, resulting in two strings at 20V at 470 mA, one string at 16V at 281 mA, one string at 24V at 346 mA, one string at 24V at 350 mA, two strings at 18V at 383 mA and two strings at 18V at 331 mA respectively.

s. LED drivers are designed or selected to drive the strings defined above as understood by those skilled in the art. See FIG. 1 for a typical architecture.

t. A method of control that causes the LED drivers to produce the desired optical power at the desired times is designed or selected as understood by those skilled in the art. In this case the CTL has independent user controls of slide potentiometers wired to the CTL to command brightness between 0 and 300 lx and CCT between 1,000 k and 10,000 k and a time clock to schedule the CS values. See FIGS. 2 and 4 for typical architectures.

u. The remainder of the fixture is designed and manufactured as understood by those skilled in the art.

v. The fixture(s) are installed in an office (see FIG. 3).

The system described above has been implemented in connection with special-purpose software programs running on general-purpose computer platforms, such as integrated microcontrollers, but it could also be implemented in whole or in part using special-purpose analog and/or digital hardware. And while the system can be broken into the series of modules and steps shown for illustration purposes, one of ordinary skill in the art would recognize that it is also possible to combine them and/or split them differently to achieve a different breakdown.

The present invention has now been described in connection with a number of specific embodiments thereof. However, numerous modifications which are contemplated as falling within the scope of the present invention should now be apparent to those skilled in the art. Therefore, it is intended that the scope of the present invention be limited only by the scope of the claims appended hereto. In addition, the order of presentation of the claims should not be construed to limit the scope of any particular term in the claims.

What is claimed is:

1. A method of designing an illumination system illuminating an occupied space to be occupied by one or more occupants, comprising:
  selecting illumination parameters for a first area illumination element,
  selecting illumination parameters for a second area illumination element, and
  deriving control parameters to derive, from selected levels of a first multi-level illumination control and selected levels of a second multi-level illumination control, a first control signal to drive the first area illumination element and a second control signal operative to drive the second area illumination element for each combination of levels from the first and second multi-level illumination controls to independently vary an illumination level and a biological attribute of the illumination of the occupied space in response to independent actuation of the first and second multi-level illumination controls.

2. The method of claim 1 wherein the step of deriving control parameters includes using a computer to derive the parameters based on equations and response curves of selected photoreceptors and visual and biological functions.

3. The method of claim 1 wherein the step of deriving control parameters includes generating a large number vectors randomly or all possible vectors at a given light source command resolution or calculating results for guided trial and error generation of Spectral Power Distributions.

4. The method of claim 3 wherein only the vectors that produce function output solutions that meet the required metrics of suitability are saved to a solution data set.

5. The method of claim 3 wherein the random process is stopped after the suitability of the light sources is verified and a large set of vectors is produced that can be used to tune the control parameters.

6. The method of claim 3 wherein the step of deriving control parameters includes not evaluating some Spectral Power Distributions in areas producing poor results and trying more vector inputs in areas producing favorable results.

7. The method of claim 3 wherein the step of deriving control parameters includes selecting more or different light sources and trying again if required metrics of suitability for high and low biological functions are not met.

8. The method of claim 3 wherein the step of deriving control parameters includes finding a vector in the solution data set that is close enough to the required solution.

9. The method of claim 3 wherein the step of deriving control parameters includes finding a vector in the solution data set where all light source powers can be multiplied by the same scaling factor to be close enough to the required solution.

10. The method of claim 3 wherein the step of deriving control parameters includes finding two vectors in the solution data set who's solutions closely bracket a required solution and interpolating a vector that will produce the required solution.

11. The method of claim 3 wherein the step of deriving control parameters includes using curve fitting to derive a closed-form equation calculating a required solution from the command inputs.

12. The method of claim 1 wherein the step of deriving control parameters includes training AI on a solution data set to produce a solution from command inputs.

13. The method of claim 1 wherein the step of deriving control parameters is further based on a control law that also implements an energy delivery and/or energy efficiency function.

14. The method of claim 1 wherein the step of deriving control parameters is further based on a control law that is also based on selected occupant photoreceptors.

15. The method of claim 1 wherein the step of deriving control parameters is further based on a control law that is also based on influencing an occupant circadian rhythm.

16. The method of claim 1 wherein the step of deriving control parameters is further based on a control law that preferably adjusts light in wavelengths that contribute differently to biological illumination parameters and perceived visual brightness.

17. A computer-based system for designing an illumination system illuminating an occupied space to be occupied by one or more occupants, comprising:
   means for selecting illumination parameters for a first area illumination element,
   means for selecting illumination parameters for a second area illumination element, and
   means for deriving control parameters to derive, from selected levels of a first multi-level illumination control and selected levels of a second multi-level illumination control, a first control signal to drive the first area illumination element and a second control signal operative to drive the second area illumination element for each combination of levels from the first and second multi-level illumination controls to independently vary an illumination level and a biological attribute of the illumination of the occupied space in response to independent actuation of the first and second multi-level illumination controls.

* * * * *